(12) United States Patent
Fujishima

(10) Patent No.: US 12,403,704 B2
(45) Date of Patent: Sep. 2, 2025

(54) TRANSPORT DEVICE AND LIQUID EJECTING APPARATUS

(71) Applicant: SEIKO EPSON CORPORATION, Tokyo (JP)

(72) Inventor: Kazutoshi Fujishima, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 163 days.

(21) Appl. No.: 18/479,721

(22) Filed: Oct. 2, 2023

(65) Prior Publication Data

US 2024/0109340 A1 Apr. 4, 2024

(30) Foreign Application Priority Data

Oct. 3, 2022 (JP) .................................. 2022-159315

(51) Int. Cl.
*B41J 11/00* (2006.01)
*B41J 15/04* (2006.01)
*B41J 29/17* (2006.01)
*B65G 45/12* (2006.01)

(52) U.S. Cl.
CPC ............ *B41J 11/007* (2013.01); *B41J 29/17* (2013.01); *B65G 45/12* (2013.01); *B41P 2235/21* (2013.01); *B41P 2235/22* (2013.01)

(58) Field of Classification Search
CPC ............ B41J 2002/16591; B41J 11/007; B41J 15/048; B41J 29/17
See application file for complete search history.

(56) References Cited

U.S. PATENT DOCUMENTS

| 2022/0161581 | A1* | 5/2022 | Kobayashi | B41J 29/17 |
| 2022/0203748 | A1* | 6/2022 | Komatsu | B41M 7/0018 |

FOREIGN PATENT DOCUMENTS

| JP | 2022-083155 A | 6/2022 | |
| JP | 2022171302 A | * 11/2022 | B08B 1/12 |

OTHER PUBLICATIONS

Matsumoto, Machine Translation of JP-2022171302-A, 2022 (Year: 2022).*

* cited by examiner

*Primary Examiner* — Scott A Richmond
(74) *Attorney, Agent, or Firm* — WORKMAN NYDEGGER

(57) ABSTRACT

A transport device including a transporting belt that includes a medium-supportable outer circumferential surface and transports the medium, a cleaning roller capable of cleaning the outer circumferential surface, a storage unit that stores a cleaning liquid supplied to the outer circumferential surface via the cleaning roller, a discharge port through which the cleaning liquid is dischargeable, a flow path pipe through which the discharged cleaning liquid is passable, a pump that changes an internal pressure of the flow path pipe to cause the cleaning liquid to flow so that the cleaning liquid stored in the storage unit is discharged from the storage unit through the discharge port and the flow path pipe, a sensor capable of detecting the internal pressure of the flow path pipe, and a control unit that determines a state of the cleaning liquid stored in the storage unit based on a detection result of the sensor.

7 Claims, 5 Drawing Sheets

TRANSPORT DEVICE AND LIQUID EJECTING APPARATUS

The present application is based on, and claims priority from JP Application Serial Number 2022-159315, filed Oct. 3, 2022, the disclosure of which is hereby incorporated by reference herein in its entirety.

BACKGROUND

1. Technical Field

The present disclosure relates to a transport device and a liquid ejecting apparatus.

2. Related Art

In the past, various transport devices in each of which a transporting belt is used to transport a medium have been used. Among them, there is a transport device including a cleaning roller capable of cleaning a transporting belt, and a storage unit in which a cleaning liquid is stored. For example, JP 2022-83155 A discloses a processing device including a cleaning brush capable of cleaning a transporting belt, and a storage tank in which a cleaning liquid is stored.

In the transport device including the cleaning roller capable of cleaning the transporting belt, and the storage unit in which the cleaning liquid is stored, a thickened substance containing, for example, an ink component may accumulate in the storage unit. When the thickened substance accumulates in the storage unit, a discharge port provided at the storage unit may be clogged. Here, the processing device of JP 2022-83155 A includes a first pump that moves the cleaning liquid stored in the storage tank to, for example, a flocculation tank, a processing device control unit that controls operation of each unit of the processing device and a concentration measurement unit that measures concentration of the ink component contained in the cleaning liquid in the storage tank. Then, the processing device control unit determines whether the concentration measured by the concentration measuring unit reaches a predetermined value or not, and drives the first pump to move the cleaning liquid from the storage tank to the flocculation tank with the reaching of the predetermined value as a trigger. However, in the processing device in JP 2022-83155 A, when the ink component or the like forms a thickened substance, the storage tank may be clogged with the thickened substance when the cleaning liquid stored in the storage tank is discharged from the storage tank, and there is a possibility that the cleaning liquid cannot be properly discharged from the storage tank. In the processing device of JP 2022-83155 A, an idea of appropriately determining whether there is a sign of formation of a thickened substance or not is not considered. This is because, in addition to the concentration of the ink component, various factors such as a state of the cleaning liquid and an environmental temperature are involved in the formation of the thickened substance by the ink component or the like.

SUMMARY

A transport device of the present disclosure in order to solve the above-described problems includes a transporting belt including an outer circumferential surface on which a medium is supportable, and configured to transport the medium, a cleaning roller being in contact with the outer circumferential surface, and configured to clean the outer circumferential surface while rotating, a storage unit in which a cleaning liquid supplied to the outer circumferential surface via the cleaning roller is stored, a discharge port through which the cleaning liquid is dischargeable, a flow path pipe that communicates with the discharge port, and through which the cleaning liquid discharged through the discharge port is passable, a pump configured to change an internal pressure of the flow path pipe to cause the cleaning liquid to flow so that the cleaning liquid stored in the storage unit is discharged from the storage unit through the discharge port and the flow path pipe, a sensor configured to detect the internal pressure of the flow path pipe, and a control unit configured to determine a state of the cleaning liquid stored in the storage unit based on a detection result of the sensor.

Additionally, a liquid ejecting apparatus of the present disclosure in order to solve the above-described problems includes an ejecting unit configured to eject a liquid droplet onto a medium, a transporting belt including an outer circumferential surface on which the medium is supportable, and configured to transport the medium, a cleaning roller being in contact with the outer circumferential surface, and configured to clean the outer circumferential surface while rotating, a storage unit in which a cleaning liquid supplied to the outer circumferential surface via the cleaning roller is stored, a discharge port through which the cleaning liquid is dischargeable, a flow path pipe that communicates with the discharge port, and through which the cleaning liquid discharged through the discharge port is passable, a pump configured to change an internal pressure of the flow path pipe to cause the cleaning liquid to flow so that the cleaning liquid stored in the storage unit is discharged from the storage unit through the discharge port and the flow path pipe, a sensor configured to detect the internal pressure of the flow path pipe, and a control unit configured to determine a state of the cleaning liquid stored in the storage unit based on a detection result of the sensor.

DESCRIPTION OF EMBODIMENTS

Figure 1:
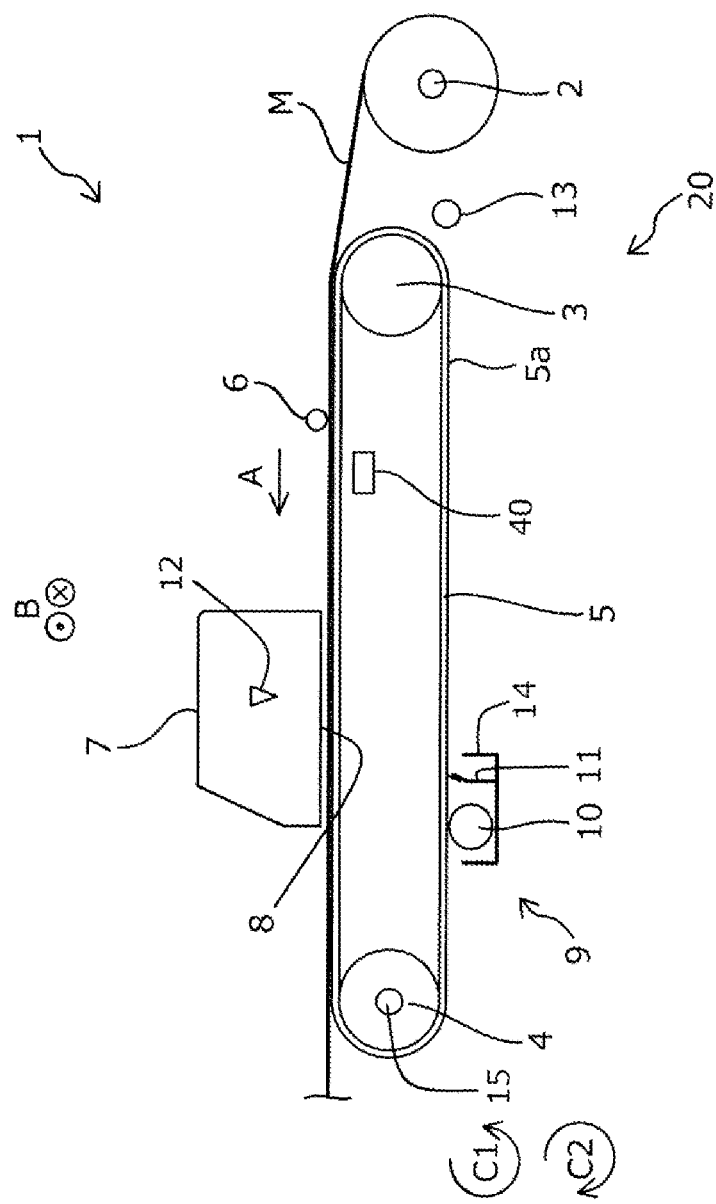
FIG. 1 is a side view of a liquid ejecting apparatus according to Example 1 of the present disclosure.

First, the present disclosure will be generally described.

A transport device of a first aspect of the present disclosure in order to solve the above-described problems includes a transporting belt including an outer circumferential surface on which a medium is supportable, and configured to transport the medium, a cleaning roller being in contact with the outer circumferential surface, and configured to clean the outer circumferential surface while rotating, a storage unit in which a cleaning liquid supplied to the outer circumferential surface via the cleaning roller is stored, a discharge port through which the cleaning liquid is dischargeable, a flow path pipe that communicates with the discharge port, and through which the cleaning liquid discharged through the discharge port is passable, a pump configured to change an internal pressure of the flow path pipe to cause the cleaning liquid to flow so that the cleaning liquid stored in the storage unit is discharged from the storage unit through the discharge port and the flow path pipe, a sensor configured to detect the internal pressure of the flow path pipe, and a control unit configured to determine a state of the cleaning liquid stored in the storage unit based on a detection result of the sensor.

According to the present aspect, the pump that changes the internal pressure of the flow path pipe to cause the cleaning liquid to flow so that the cleaning liquid stored in the storage unit is discharged from the storage unit through the discharge port and the flow path pipe, the sensor capable of detecting the internal pressure of the flow path pipe, and the control unit that determines the state of the cleaning liquid stored in the storage unit based on the detection result of the sensor are included. When the thickened substance is formed in the storage unit, the discharge port is blocked and an opening area of the discharge port is reduced, the internal pressure of the flow path pipe is changed, and with such a configuration, the control unit can appropriately determine whether there is a sign of formation of a thickened substance or not, and when the control unit appropriately performs the above determination, it is possible to prevent a thickened substance from accumulating in the storage unit in which the cleaning liquid is stored and the discharge port from being clogged.

A transport device of a second aspect of the present disclosure is the first aspect that includes a stirring unit configured to stir the cleaning liquid stored in the storage unit, wherein the control unit, when determining that the discharge port is clogged based on the detection result of the sensor, operates the stirring unit.

According to the present aspect, the stirring unit capable of stirring the cleaning liquid stored in the storage unit is included, and the control unit, when determining that the discharge port is clogged based on the detection result of the sensor, operates the stirring unit. With such a configuration, when there is a sign of formation of a thickened substance, by immediately operating the stirring unit, it is possible to suppress growth of the thickened substance and decompose the thickened substance, thereby suppressing clogging of the discharge port.

A transport device of a third aspect of the present disclosure is the first or second aspect, wherein the pump is configured to cause the cleaning liquid stored in the storage unit to flow in a first direction to be discharged through the discharge port and the flow path pipe, and in a second direction opposite to the first direction, and the control unit, when determining that the discharge port is clogged based on the detection result of the sensor, controls the pump to change a flow direction of the cleaning liquid from the first direction to the second direction.

According to the present aspect, the pump is capable of causing the cleaning liquid to flow in the first direction and the second direction, and the control unit, when determining that the discharge port is clogged based on the detection result of the sensor, changes the flow direction of the cleaning liquid from the first direction to the second direction. That is, by changing the flow direction of the cleaning liquid from the first direction to the second direction, the cleaning liquid is directed from the flow path pipe to the storage unit. By doing so, in a state where at least a part of the discharge port is clogged with the thickened substance, the thickened substance can be pushed out from the flow path pipe toward the storage unit, and at least a part of the thickened substance covering the discharge port can be peeled off from the discharge port in this process of pushing out. Thus, the clogging of the discharge port can be improved.

A transport device of a fourth aspect of the present disclosure is the third aspect, wherein the control unit controls the pump to perform operation twice or more for changing the flow direction between the first direction and the second direction.

According to the present aspect, the control unit controls the pump to perform the operation twice or more for changing the flow direction between the first direction and the second direction. Therefore, a probability that at least a part of the thickened substance covering the discharge port is peeled off from the discharge port is increased, and the discharge port and the flow path pipe can be cleaned with the cleaning liquid by causing the cleaning liquid to flow a plurality of times while changing the flow direction. As a result, clogging of the discharge port can be effectively improved.

A transport device of a fifth aspect of the present disclosure is the first or second aspect that includes a heating unit configured to heat the cleaning liquid stored in the storage unit, wherein the control unit, when determining that the discharge port is clogged based on the detection result of the sensor, changes output of the heating unit from first output to second output greater than the first output.

According to the present aspect, the heating unit capable of heating the cleaning liquid stored in the storage unit is included, and the control unit, when determining that the discharge port is clogged based on the detection result of the sensor, changes the output of the heating unit from the first output to the second output. With such a configuration, the thickened substance generated in the storage unit can be re-dissolved in the cleaning liquid, and growth of the thickened substance can be delayed or the thickened substance can be decomposed.

A transport device of a sixth aspect of the present disclosure is the fifth aspect, wherein the heating unit is provided along an edge of the discharge port.

According to the present aspect, the heating unit is provided along the edge of the discharge port. With such a configuration, it is possible to appropriately heat the thickened substance near the discharge port. As a result, the thickened substance is easily re-dissolved in the cleaning liquid, and it is possible to particularly effectively delay growth of the thickened substance or decompose the thickened substance.

A liquid ejecting apparatus of a seventh aspect of the present disclosure includes an ejecting unit configured to eject a liquid droplet onto a medium, a transporting belt including an outer circumferential surface on which the medium is supportable, and configured to transport the medium, a cleaning roller being in contact with the outer circumferential surface, and configured to clean the outer circumferential surface while rotating, a storage unit in which a cleaning liquid supplied to the outer circumferential surface via the cleaning roller is stored, a discharge port through which the cleaning liquid is dischargeable, a flow path pipe that communicates with the discharge port, and through which the cleaning liquid discharged through the discharge port is passable, a pump configured to change an internal pressure of the flow path pipe to cause the cleaning liquid to flow so that the cleaning liquid stored in the storage unit is discharged from the storage unit through the discharge port and the flow path pipe, a sensor configured to detect the internal pressure of the flow path pipe, and a control unit configured to determine a state of the cleaning liquid stored in the storage unit based on a detection result of the sensor.

According to the present aspect, the pump that changes the internal pressure of the flow path pipe to cause the cleaning liquid to flow so that the cleaning liquid stored in the storage unit is discharged from the storage unit through the discharge port and the flow path pipe, the sensor capable of detecting the internal pressure of the flow path pipe, and the control unit that determines the state of the cleaning liquid stored in the storage unit based on the detection result of the sensor are included. With such a configuration, the control unit can appropriately determine whether there is a sign of formation of the thickened substance or not, and when the control unit appropriately performs the above determination, it is possible to prevent the thickened substance from accumulating in the storage unit in which the cleaning liquid is stored and the discharge port from being clogged.

Hereinafter, an embodiment according to the present disclosure will be described with reference to the accompanying drawings.

Example 1

First, an outline of a liquid ejecting apparatus 1 of Example 1 of the present disclosure will be described with reference to FIG. 1. As illustrated in FIG. 1, the liquid ejecting apparatus 1 of the present example includes a transport device 20 capable of transporting a medium M in a transport direction A. Note that in the liquid ejecting apparatus 1 of the present example, a device from which a carriage 7 to be described below is removed can be regarded as the transport device 20, but the entire liquid ejecting apparatus 1 including the carriage 7 can be regarded as the transport device 20.

The transport device 20 includes a feeding unit 2 in which the medium M having a roll shape is set and is rotated in a rotation direction C1 such that the medium M can be fed. Further, the transport device 20 includes a transporting belt 5 capable of transporting the medium M fed from the feeding unit 2, in the transport direction A. The transport device 20 includes a driven roller 3 located upstream in the transport direction A, a driving roller 4 located downstream in the transport direction A, and the transporting belt 5, which is an endless belt stretched across the driven roller 3 and the driving roller 4.

Here, the transporting belt 5 is an adhesive belt including an outer circumferential surface 5a in which a support face of the medium M which is an outer face is applied with an adhesive. As illustrated in FIG. 1, the medium M is supported and transported by the transporting belt 5 in a state in which the medium M is attached to the outer circumferential surface 5a. In the liquid ejecting apparatus 1 of the present example, a support region of the medium M in the transporting belt 5 is an upper-side region stretched across the driven roller 3 and the driving roller 4. Further, the driving roller 4 is a roller that rotates under driving force from a motor 15, and the driven roller 3 is a roller that rotates in response to the rotation of the transporting belt 5 when the driving roller 4 is rotated.

In addition, the liquid ejecting apparatus 1 includes the carriage 7 capable of reciprocating in a width direction B of the transporting belt 5, and a head 8 attached to the carriage 7. The head 8 functions as a printing unit capable of printing an image on the medium M transported in the transport direction A, in other words, functions as an ejecting unit that ejects ink, which is liquid, onto the medium M. The head 8 is provided at a position facing the support region of the medium M in the transporting belt 5 and is capable of ejecting ink. At this time, it can be said that the support region of the medium M in the transporting belt 5 is a facing region facing the head 8. The liquid ejecting apparatus 1 of the present example is capable of forming an image by ejecting ink from the head 8 onto the transported medium M while reciprocating the carriage 7 in the width direction B, which intersects with the transport direction A. By including the carriage 7 configured in this manner, the liquid ejecting apparatus 1 of the present example can form a desired image on the medium M by repeating the transport of the medium M in the transport direction A by a predetermined transport amount, and the ejection of the ink while moving the carriage 7 in the width direction B while the medium M is stopped.

Note that the liquid ejecting apparatus 1 of the present example is a so-called serial printer that repeats the transport of the medium M by a predetermined transport amount and the reciprocation of the carriage 7 to perform printing, but may be a so-called line printer that uses a line head formed with nozzles in a line shape along the width direction B of the medium M, to successively perform recording while successively transporting the medium M. Furthermore, a printing apparatus including a printing unit having a configuration different from that of a so-called ink jet printing unit that performs printing by ejecting ink.

In the liquid ejecting apparatus 1 of the present example, an imaging unit 12 is provided at the carriage 7, and a configuration is adopted in which an image formed by ejecting ink from the head 8 can be imaged by the imaging unit 12. Data of the image imaged by the imaging unit 12 is transmitted to the control unit 40. The control unit 40 can determine whether a predetermined transport amount per one time of the transporting belt 5 is deviated from a predetermined amount or not, and determine, when the deviation occurs, an extent of the deviation, based on the data, a detection result of an encoder (not illustrated), and the like. The control unit 40 performs overall control of each constituent member of the liquid ejecting apparatus 1 of the present example.

Additionally, a medium affixing portion 6 is formed at a position opposite the transporting belt 5, upstream the carriage 7 in the transport direction A. When the medium affixing portion 6 presses the medium M against the transporting belt 5 across the width direction B, the medium M is affixed to the transporting belt 5 in a state where generation of wrinkles and the like is suppressed.

Upon being discharged from the liquid ejecting apparatus 1 of the present example, the medium M on which an image is formed by ink being ejected from the head 8 is fed to a drying device that volatilizes components in the ink ejected onto the medium M, a winding device that winds up the medium M on which the image is formed, and the like provided in stages following the liquid ejecting apparatus 1 of the present example.

Here, a printable material may be used as the medium M. The term "printable material" refers to a fabric, a garment, and other clothing products on which printing can be performed. Fabrics includes natural fibers such as cotton, silk and wool, chemical fibers such as nylon, or composite fibers of natural fibers and chemical fibers such as woven cloths, knit fabrics, and non-woven cloths. Garments and other clothing products include sewn products, such as a T-shirt, handkerchief, scarf, towel, handbag, fabric bag, and furniture-related products including a curtain, sheet, and bed cover, as well as fabric before and after cutting to serve as pieces of cloth before sewing.

Furthermore, in addition to the printable material described above, the medium M may be special paper for ink-jet printing, such as plain paper, pure paper, or glossy paper. Other materials that can be used as the medium M include, for example, plastic films without a surface treatment applied to serve as an ink absorption layer for ink-jet printing, as well as substrates such as paper being applied a plastic coating and substrates being bonded a plastic film. Such plastic materials include, but are not limited to, for example, polyvinyl chloride, polyethylene terephthalate, polycarbonate, polystyrene, polyurethane, polyethylene, and polypropylene.

When a printable material is used as the medium M, bleed-through of ink easily occurs which is a phenomenon where the ink ejected onto the medium M bleeds through to a rear surface of the medium, and there are therefore cases where the transporting belt 5 is soiled by the ink. Accordingly, the liquid ejecting apparatus 1 of the present example includes a cleaning unit 9 for cleaning ink that bleeds through and adheres to the transporting belt 5. Although details will be described later, the cleaning unit 9 of the present example includes a storage unit 14 in which a cleaning liquid L is stored, a cleaning roller 10 in which the cleaning liquid L is immersed and which comes into contact with the transporting belt 5, and a blade portion 11 which wipes the cleaning liquid L adhering to the transporting belt 5. Furthermore, the liquid ejecting apparatus 1 of the present example includes an air blowing unit 13 capable of drying the cleaning liquid L that is not completely wiped off by the blade portion 11.

The liquid ejecting apparatus 1 of the present example can transport the medium M in the transport direction A by rotating the driving roller 4 in the rotation direction C1. Further, the liquid ejecting apparatus 1 is capable of transporting the medium M in a direction opposite to the transport direction A by rotating the driving roller 4 in a rotation direction C2 that is a direction opposite to the rotation direction C1.

Figure 2:
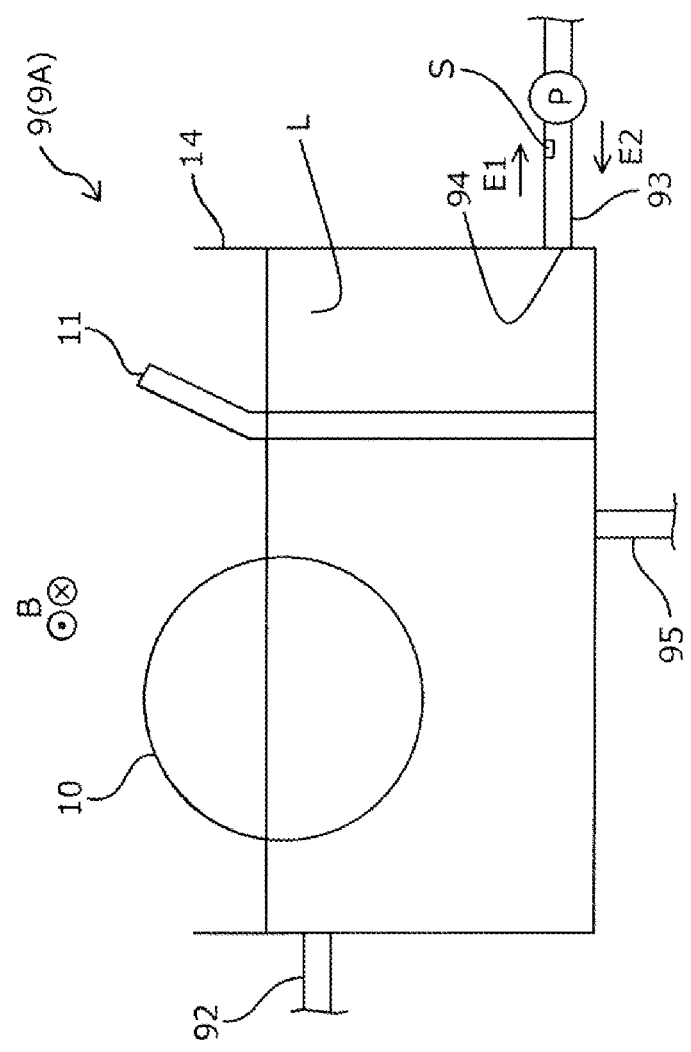
FIG. 2 is a schematic diagram of a cleaning device in the liquid ejecting apparatus of FIG. 1.

Next, the cleaning unit 9 which is an important part of the liquid ejecting apparatus 1 of the present example will be described in detail with reference to FIG. 2. As illustrated in FIG. 2, a cleaning unit 9A as the cleaning unit 9 of the liquid ejecting apparatus 1 of the present example includes the cleaning roller 10 that is in contact with the outer circumferential surface 5a of the transporting belt 5 and is capable of cleaning the outer circumferential surface 5a while rotating. Further, the blade portion 11 that wipes the cleaning liquid L that adheres to the transporting belt 5 since the cleaning roller 10 is brought into contact with the transporting belt 5 is included. Note that although the cleaning unit 9A of the present example includes one cleaning roller 10 and one blade portion 11, at least one of a plurality of the cleaning rollers 10 and a plurality of the blade portions 11 may be included.

Further, the cleaning unit 9A includes the storage unit 14 coupled to a flow path pipe 92 as a path for supplying the cleaning liquid L, a flow path pipe 93 as a discharging path that communicates with a discharge port 94 through which the cleaning liquid L can be discharged, and through which the cleaning liquid L discharged through the discharge port 94 is passed and can be discharged, and a flow path pipe 95 as a circulating path through which the cleaning liquid L can be fed to the flow path pipe 92 again. Note that in the cleaning unit 9A of the present example, the flow path pipe 92 and the flow path pipe 93 are coupled to a side surface of the storage unit 14, and the flow path pipe 95 is coupled to a bottom surface of the storage unit 14, but the coupling positions of the flow path pipes are not limited to such coupling positions. For example, the flow path pipe 93 may be coupled to the bottom surface of the storage unit 14.

The storage unit 14 stores the cleaning liquid L, and the cleaning roller 10 comes into contact with the outer circumferential surface 5a and cleans the outer circumferential surface 5a by rotating in the rotation direction C1 or the rotation direction C2 while supplying the cleaning liquid L stored in the storage unit 14 to the outer circumferential surface 5a. Here, valves (not illustrated) are provided at the flow path pipe 92 and the flow path pipe 95. On the other hand, the flow path pipe 93 is provided with a pump P, and the pump P is configured to be capable of changing an internal pressure of the flow path pipe 93 between a negative pressure and a positive pressure to cause the cleaning liquid L to flow so that the cleaning liquid L stored in the storage unit 14 is discharged from the storage unit 14 through the discharge port 94 and the flow path pipe 93. Further, the flow path pipe 93 is provided with a sensor S capable of detecting the internal pressure of the flow path pipe 93. Note that a configuration and an arrangement of the sensor S are not particularly limited as long as the sensor S is capable of detecting the internal pressure of the flow path pipe 93, and for example, a configuration may be adopted in which the sensor S is provided at the pump P and is capable of measuring a pump pressure of the pump P.

As the outer circumferential surface 5a of the transporting belt 5 is cleaned by the cleaning unit 9A, ink or the like adhering to the outer circumferential surface 5a moves to the storage unit 14. Then, the ink may accumulate in the storage unit 14. The ink may originally contain a solid component such as a pigment or a solvent as an ink component, and the ink component may form a thickened substance depending on a component of the solvent. The thickened substance may be generated due to various factors such as a simple increase in concentration of the solid component, a reaction with a component such as a surfactant of the cleaning liquid L to aggregate, and a decrease in dispersibility of the solid component due to a low temperature of the cleaning liquid L. When the ink component forms the thickened substance and the thickened substance is accumulated in the storage unit 14, there is a possibility that the discharge port 94 or the flow path pipe 93 is clogged.

Here, as described above, the liquid ejecting apparatus 1 of the present example includes the control unit 40, and the control unit 40 is configured to be able to determine a state of the cleaning liquid L stored in the storage unit 14 based on a detection result of the sensor S. When a thickened substance is formed in the storage unit 14, and for example, the discharge port 94 is blocked and an opening area of the discharge port 94 decreases, an internal pressure of the flow path pipe 93 changes. That is, there is a possibility that even when the pump P is driven, the cleaning liquid L is not discharged through the flow path pipe 93. Therefore, by adopting the configuration of the present example, the control unit 40 can appropriately determine whether there is a sign of formation of a thickened substance or not, and when the control unit 40 appropriately makes the above determination, it is possible to suppress accumulation of a thickened substance in the storage unit 14 in which the cleaning liquid L is stored and clogging of the discharge port 94.

Figure 3:
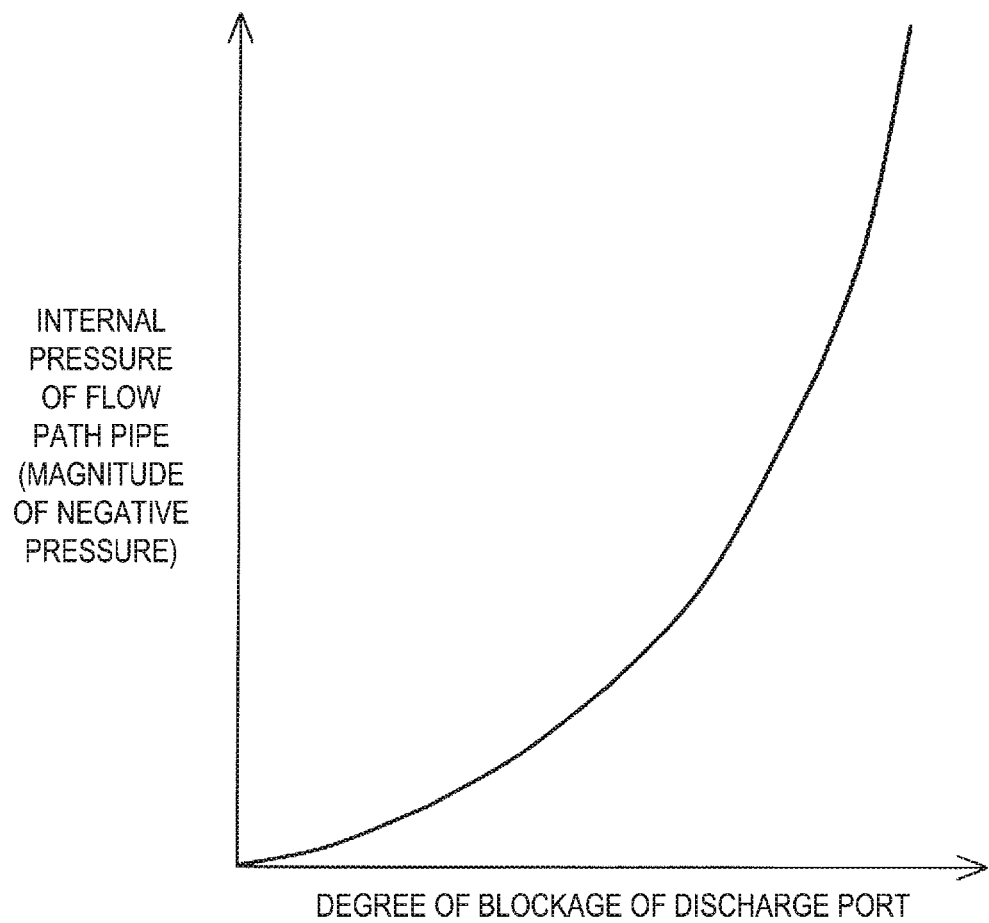
FIG. 3 is a conceptual graph showing, when a thickened substance is formed in the liquid ejecting apparatus of FIG. 1 and the thickened substance reaches an inside of a flow path pipe via a discharge port, internal pressure of the flow path pipe.

Here, a change in the internal pressure of the flow path pipe 93 when a thickened substance accumulates in a vicinity of the discharge port 94 of the storage unit 14 and the discharge port 94 is gradually blocked will be described using FIG. 3. FIG. 3 is a conceptual graph showing the internal pressure of the flow path pipe 93, and as shown in FIG. 3, the internal pressure of the flow path pipe 93 increases at an accelerated rate as the thickened substance accumulates. Note that in the present example, since the pump P is a pump that discharges the cleaning liquid L via the flow path pipe 93 by suctioning an inside of the flow path pipe 93 to create a negative pressure, a vertical axis of FIG. 3 represents magnitude of the negative pressure.

In the liquid ejecting apparatus 1 of to the present example, the pump P is configured to be capable of not only making the internal pressure of the flow path pipe 93 negative but also making the internal pressure of the flow path pipe 93 positive. That is, the pump P of the present example can cause the cleaning liquid stored in the storage unit to flow in a first direction E1 in which the cleaning liquid is discharged through the discharge port 94 and the flow path pipe 93 and in a second direction E2 opposite to the first direction E1. To be specific, the pump P can cause the cleaning liquid L to flow in the first direction E1 by making the internal pressure of the flow path pipe 93 negative. Further, the pump P can cause the cleaning liquid L to flow in the second direction E2 by making the internal pressure of the flow path pipe 93 positive. Then, when determining that the discharge port 94 is clogged based on a detection result of the sensor S, the control unit 40 can control the pump P, specifically, controls the pump P to change the internal pressure of the flow path pipe 93 from negative to positive to change the flowing direction of the cleaning liquid L from the first direction E1 to the second direction E2.

Since the liquid ejecting apparatus 1 of the present example has such a configuration, it is possible to change the flowing direction of the cleaning liquid L from the first direction E1 to the second direction E2 and to direct the cleaning liquid L from the flow path pipe 93 to the storage unit 14. Then, by directing the cleaning liquid L from the flow path pipe 93 to the storage unit 14, in a state where at least a part of the discharge port 94 is clogged with a thickened substance, the thickened substance can be pushed out from the flow path pipe 93 toward the storage unit 14, and at least a part of the thickened substance covering the discharge port 94 can be peeled off from the discharge port 94 and directed toward an inside of the storage unit 14 in this process of pushing out. As a result, the clogging of the discharge port 94 can be improved.

In addition, by controlling the pump P, the control unit 40 of the liquid ejecting apparatus 1 of the present example can perform operation twice or more for changing the flowing direction of the cleaning liquid L between the first direction E1 and the second direction E2. By performing the operation twice or more for changing the flowing direction of the cleaning liquid L between the first direction E1 and the second direction E2, a probability that at least a part of a thickened substance covering the discharge port 94 is peeled off from the discharge port 94 is increased, and the discharge port 94 and the flow path pipe 93 can be cleaned with the cleaning liquid L by causing the cleaning liquid L to flow a plurality of times while changing the flowing direction. Thus, the clogging of the discharge port 94 can be effectively improved.

Example 2

Figure 4:
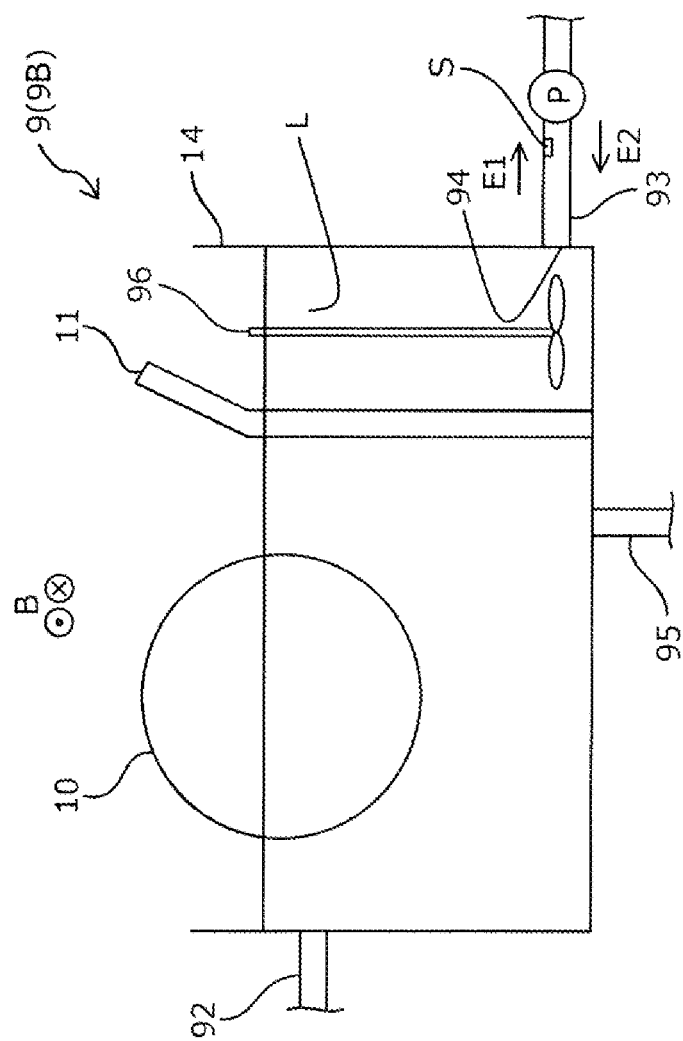
FIG. 4 is a schematic diagram of a cleaning device in a liquid ejecting apparatus according to Example 2 of the present disclosure.

Hereinafter, the liquid ejecting apparatus 1 of Example 2 will be described using FIG. 4. FIG. 4 is a diagram corresponding to FIG. 2 of the liquid ejecting apparatus 1 of Example 1. Here, the liquid ejecting apparatus 1 of the present example has a configuration similar to that of the liquid ejecting apparatus 1 of Example 1 except for a configuration of the cleaning unit 9, specifically, except that a stirring unit 96 is included inside the storage unit 14, thus description of common portions will be omitted. Note that the constituent members common to those in Embodiment 1 described above are denoted by the same reference numerals, and the detailed description will be omitted.

As illustrated in FIG. 4, a cleaning unit 9B in the liquid ejecting apparatus 1 of the present example as the cleaning unit 9 includes the stirring unit 96 capable of stirring the cleaning liquid L stored in the storage unit 14. Then, when determining that the discharge port 94 is clogged based on a detection result of the sensor S, the control unit 40 can operate the stirring unit 96. With such a configuration, when there is a sign of formation of a thickened substance, by immediately operating the stirring unit 96, it is possible to suppress growth of the thickened substance and decompose the thickened substance, thereby suppressing clogging of the discharge port 94. Note that although the stirring unit 96 of the present example has a propeller shape, the configuration of the stirring unit 96 is not particularly limited. For example, an ultrasonic generator that decomposes a thickened substance by generating ultrasonic waves, or the like can be used as the stirring unit 96.

Example 3

Figure 5:
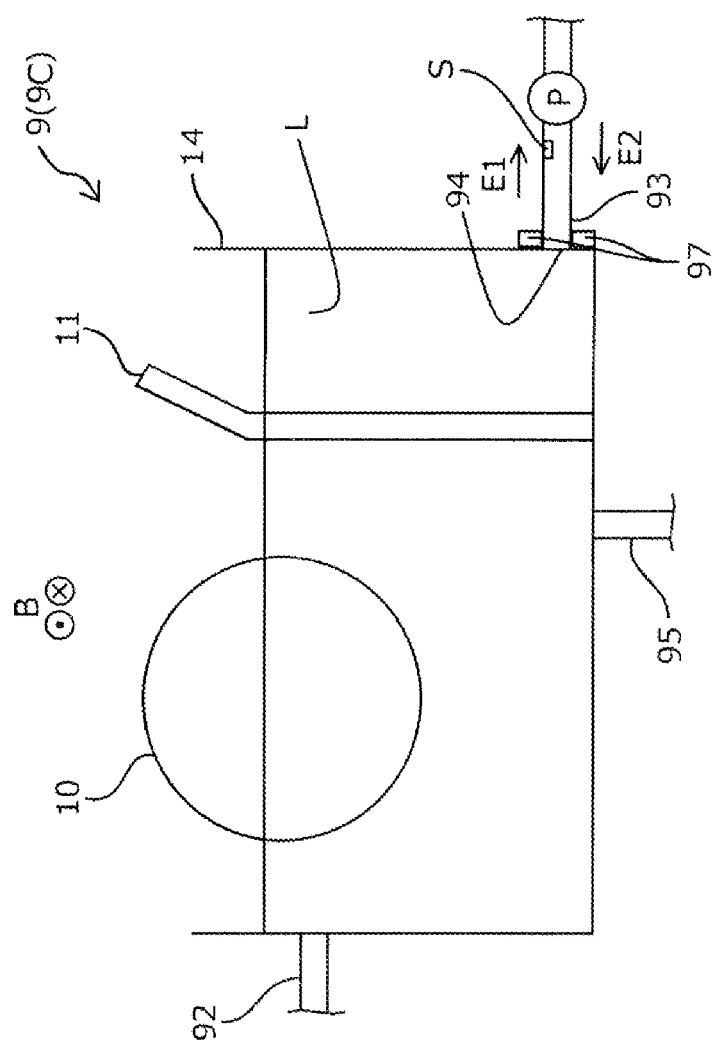
FIG. 5 is a schematic diagram of a cleaning device in a liquid ejecting apparatus according to Example 3 of the present disclosure.

Hereinafter, the liquid ejecting apparatus 1 of Example 3 will be described using FIG. 5. FIG. 5 is a diagram corresponding to FIG. 2 of the liquid ejecting apparatus 1 of Example 1. Here, the liquid ejecting apparatus 1 of the present example has a configuration similar to that of the liquid ejecting apparatus 1 of Example 1 except for a configuration of the cleaning unit 9, specifically, except that a heating unit 97 is included, thus description of common portions will be omitted. Like numbers designate identical or corresponding component elements in the examples 1 and 2, described above, and detailed description for such component elements are omitted.

As illustrated in FIG. 5, a cleaning unit 9C in the liquid ejecting apparatus 1 of the present example as the cleaning unit 9 includes the heating unit 97 capable of heating the cleaning liquid L stored in the storage unit 14. The heating unit 97 is in contact with an outside of the storage unit 14, and is disposed in an annular shape along an edge of the discharge port 94 so as to surround the flow path pipe 93. Then, when determining that the discharge port 94 is clogged based on a detection result of the sensor S, the control unit 40 can change output of the heating unit 97 from first output during normal use to second output greater than the first output. With such a configuration, the thickened substance generated in the storage unit 14 can be re-dissolved in the cleaning liquid, and growth of the thickened substance can be delayed or the thickened substance can be decomposed. Note that "Changing from the first output during normal use to the second output greater than the first output" includes turning off driving of the heating unit 97 as the first output during normal use and turning on the driving of the heating unit 97 as the second output when the control unit 40 determines that the discharge port 94 is clogged.

Here, as illustrated in FIG. 5, the heating unit 97 is provided along the edge of the discharge port 94. With such a configuration, it is possible to appropriately heat a thickened substance near the discharge port 94. As a result, the thickened substance is easily re-dissolved in the cleaning liquid L, and it is possible to particularly effectively delay growth of the thickened substance or decompose the thickened substance. Note that the heating unit 97 of the present example is a sheet-shaped heater that can be attached from an outside of the storage unit 14, but the configuration of the heating unit 97 is not particularly limited. A heater having a configuration other than that of the sheet-like heater may be used, and the heater may be disposed inside the storage unit 14.

The present disclosure is not limited to the above embodiments, and various modifications are possible within the scope of the disclosure described in the claims, and these modifications are also included in the scope of the present disclosure.

What is claimed is:

1. A transport device, comprising:
   a transporting belt including an outer circumferential surface on which a medium is supportable, and configured to transport the medium;
   a cleaning roller being in contact with the outer circumferential surface, and configured to clean the outer circumferential surface while rotating;
   a storage unit in which a cleaning liquid supplied to the outer circumferential surface via the cleaning roller is stored;
   a discharge port through which the cleaning liquid is dischargeable;
   a flow path pipe that communicates with the discharge port, and through which the cleaning liquid discharged through the discharge port is passable;
   a pump configured to change an internal pressure of the flow path pipe to cause the cleaning liquid to flow so that the cleaning liquid stored in the storage unit is discharged from the storage unit through the discharge port and the flow path pipe;
   a sensor configured to detect the internal pressure of the flow path pipe; and
   a control unit configured to determine a state of the cleaning liquid stored in the storage unit based on a detection result of the sensor.

2. The transport device according to claim 1, comprising a stirring unit configured to stir the cleaning liquid stored in the storage unit, wherein
   the control unit, when determining that the discharge port is clogged based on the detection result of the sensor, operates the stirring unit.

3. The transport device according to claim 1, wherein
   the pump is configured to cause the cleaning liquid stored in the storage unit to flow in a first direction to be discharged through the discharge port and the flow path pipe, and in a second direction opposite to the first direction, and
   the control unit, when determining that the discharge port is clogged based on the detection result of the sensor, controls the pump to change a flow direction of the cleaning liquid from the first direction to the second direction.

4. The transport device according to claim 3, wherein
   the control unit controls the pump to perform operation twice or more for changing the flow direction from the first direction to the second direction.

5. The transport device according to claim 1, comprising a heating unit configured to heat the cleaning liquid stored in the storage unit, wherein
   the control unit, when determining that the discharge port is clogged based on the detection result of the sensor, changes output of the heating unit from first output to second output greater than the first output.

6. The transport device according to claim 5, wherein
   the heating unit is provided along an edge of the discharge port.

7. A liquid ejecting apparatus, comprising:
   an ejecting unit configured to eject a liquid droplet onto a medium;
   a transporting belt including an outer circumferential surface on which the medium is supportable, and configured to transport the medium;
   a cleaning roller being in contact with the outer circumferential surface, and configured to clean the outer circumferential surface while rotating;
   a storage unit in which a cleaning liquid supplied to the outer circumferential surface via the cleaning roller is stored;
   a discharge port through which the cleaning liquid is dischargeable;
   a flow path pipe that communicates with the discharge port, and through which the cleaning liquid discharged through the discharge port is passable;
   a pump configured to change an internal pressure of the flow path pipe to cause the cleaning liquid to flow so that the cleaning liquid stored in the storage unit is discharged from the storage unit through the discharge port and the flow path pipe;
   a sensor configured to detect the internal pressure of the flow path pipe; and
   a control unit configured to determine a state of the cleaning liquid stored in the storage unit based on a detection result of the sensor.

* * * * *